United States Patent
Bignolles et al.

[11] Patent Number: 6,157,471
[45] Date of Patent: Dec. 5, 2000

[54] DISPLAY PANEL WITH COMPENSATION BY HOLOGRAPHIC BIREFRINGENT FILMS

[75] Inventors: Laurent Bignolles, Bordeaux; Frédéric de Lauzun, St Medard En Jalles; Bertrand Morbieu; Laurent Georges, both of Bordeaux; Jean-Claude Lehureau, Ste Genevieve des Bois, all of France

[73] Assignees: Thomson-CSF, Paris; Sextant Avionique, Velizy Villacoublay, both of France

[21] Appl. No.: 09/284,238

[22] PCT Filed: Oct. 10, 1997

[86] PCT No.: PCT/FR97/01811

§ 371 Date: Apr. 14, 1999

§ 102(e) Date: Apr. 14, 1999

[87] PCT Pub. No.: WO98/16866

PCT Pub. Date: Apr. 23, 1998

[30] Foreign Application Priority Data

Oct. 15, 1996 [FR] France ................... 96 12559

[51] Int. Cl.$^7$ ................................ G02B 5/32
[52] U.S. Cl. ............... 359/15; 359/1; 359/498; 359/499; 359/494; 349/105; 349/117

[58] Field of Search ................ 359/15, 22, 24, 359/566, 569, 499, 494, 498, 1; 349/117, 105

[56] References Cited

U.S. PATENT DOCUMENTS

| | | | |
|---|---|---|---|
| 5,347,380 | 9/1994 | Lehureau | 349/117 |
| 5,694,247 | 12/1997 | Ophey et al. | 359/566 |
| 5,801,794 | 9/1998 | Lehureau et al. | 349/117 |
| 5,812,225 | 9/1998 | De Lauzun et al. | 349/117 |

*Primary Examiner*—Audrey Chang
*Attorney, Agent, or Firm*—Oblon, Spivak, McClelland, Maier & Neustadt, P.C.

[57] ABSTRACT

A display panel having compensation using holographic birefringent films. Due to the natural birefringence of liquid crystals, contrast suffers when a liquid crystal cell is viewed at an oblique incident angle. Compensation devices made of birefringent media are used to correct this deficiency. The compensation devices include at least one film, the birefringence of which is induced by the recording of a volume hologram consisting of parallel fringes. The choice of the optical birefringent axes depends only on the orientation of the fringes so that it is easy to achieve compensation using uniaxial films which are inclined with respect to the plane of the film.

17 Claims, 3 Drawing Sheets

ON STATE

OFF STATE

- 16 POLARIZER
- A1 PERPENDICULAR NEGATIVE UNIAXIAL FILM
- A2 INCLINED NEGATIVE UNIAXIAL FILM
- 10 LIQUID-CRYSTAL CELL
- A4 INCLINED NEGATIVE UNIAXIAL FILM
- A3 PERPENDICULAR NEGATIVE UNIAXIAL FILM
- 18 POLARIZER

DISPLAY PANEL WITH COMPENSATION BY HOLOGRAPHIC BIREFRINGENT FILMS

BACKGROUND OF THE INVENTION

1. Field of the Invention

The present invention relates to electrooptic display devices, and more specifically to liquid-crystal panels, used in transmission or in reflection, or even in projection onto a screen.

2. Discussion of the Background

Most liquid-crystal panels suffer from a major drawback, this being the limited viewing angle at which they can be observed: as soon as the viewing angle departs from the normal to the surface of the panel, the contrast between white and black decreases considerably and degrades the image presented.

The object of the present invention is to provide novel technical solutions allowing the panel to be viewed with a satisfactory contrast at a viewing angle sufficiently away from the normal.

Hereinafter, the panels of interest will be mainly those in which the liquid crystal is of the twisted-nematic type and is placed between two crossed polarizers, so that the light is transmitted when there is no excitation of the crystal by an electric field and, on the other hand, is interrupted when an electric field is present. However, the invention could be used in other types of panels, and especially in a configuration having parallel polarizers where the light is interrupted when there is no electrical excitation.

The cause of the contrast deficiency at non-zero incidence will be discussed later, but for the moment it may be stated that this contrast deficiency arises from the natural birefringence of the material of which the liquid crystal is composed. The actual principle of operation of the liquid crystal relies on the dielectric anisotropy of the molecules and on the birefringence which results therefrom. The dielectric anisotropy allows the molecules to be oriented by an electric field; the birefringence modifies the polarization of the light. The combined action of these properties is very efficient in the case of light rays which pass through the panel perpendicular to the surface, but it is much less efficient in the case of rays at oblique incidence. This generally results in much poorer contrast as soon as the viewer views a cell of the panel at a viewing angle not perpendicular to the panel.

In order to try to remedy this deficiency, it has already been proposed in the prior art to combine the basic structure of the liquid-crystal panel with structures which tend to compensate for the variations in birefringence as a function of the angle of incidence.

These structures rely
  on an analysis of the birefringent action of the liquid crystal in the excited state (in the presence of an electric field),
  on an estimation of the phase retardations introduced between the two polarization components of the light by the birefringence of the liquid crystal as a function of the viewing angle and
  on the insertion of compensation films which introduce a phase difference, if possible the reverse of the estimated phase difference in the liquid crystal.

Various solutions have been described, which are more or less satisfactory, but the object of the present invention is to propose a novel technical solution to this problem.

In the technically most advanced solutions, it is proposed to use a compensation film made of a molecular material which is optically a negative uniaxial medium (the definition of such a medium will be given later), since overall it may be estimated that the liquid crystal behaves as a positive uniaxial medium, and consequently compensation using a negative uniaxial medium is a priori the most appropriate solution.

Patent EP-A-0,576,342 proposes a negative uniaxial compensation medium having an axis which is inclined with respect to the plane of the panel.

Patent EP-A-0646,829 proposes the use of two inclined negative uniaxial media.

Patent EP-A-350,383 also proposes one or two negative birefringent films.

Patent EP-A-349,900 proposes compensation using two positive uniaxial films of axes lying in the plane of the panel.

In all these solutions, the difficulty is to physically produce compensation films which actually have the desired birefringence properties. The known techniques are techniques of deposition, of stretching of films and of polymerization in an electric field or under ultraviolet illumination.

In the case of compensation using a film having an optical axis perpendicular to the plane of the film, it has been envisaged to produce the birefringence by superposing thin transparent layers of alternating optical index; U.S. Pat. No. 5,196,953 describes such a solution. Similarly, Jinn-Chou Yoo and Hang-Ping D. Shieh have proposed to produce virtually this structure of plane layers of alternating indices in the form of a volume hologram which reconstitutes index variations identical to those in the superposition of plane layers. This is explained in the article entitled "Novel Compensator with grating structure for twisted nematic liquid crystal display applications" coming from "Conference record on the 1994 International Display Research Conference and International Workshop on Active-Matrix LCD's and Display Materials, Monterey".

SUMMARY OF THE INVENTION

The present invention proposes a novel solution which consists in using, as birefringent compensation film for an electrooptic display device, a volume hologram in which a pattern of interference fringes has been recorded, giving the film birefringence properties, the interference fringes making a non-zero angle with the plane of the film in order to produce birefringence with an optical axis not perpendicular to the plane of the film, tending to compensate for the undesirable effects of the natural birefringence of the electrooptic elements. In this case, volume holograms are therefore used not for their ability to simulate a superposition of thin layers but for their birefringence properties in a chosen direction independent of the orientation of the plane of the film.

It should be pointed out that sinusoidal volume holograms (sinusoidal index variations in parallel fringes) have been recently studied from a scientific standpoint and their property of artificial birefringence for wavelengths that are broadly longer than the spacing of the fringes has been demonstrated. The present invention proposes an application of this discovery to the compensation of the birefringence of liquid-crystal panels, especially for the purpose of improving the viewing angle at which the panel may be viewed with satisfactory contrast.

Unlike the standard use of holograms, consisting in using the diffraction of light by interference fringes, the fringes used here are separated by a spacing which is smaller than the wavelength of the light which passes through them. These fringes constitute non-diffracting holograms for the light used in the liquid crystal.

Typically, the fringes are created by interference in ultraviolet light in a material that is photosensitive to ultraviolet, whereas the panel is intended to be viewed in visible light (especially in green light).

As will be seen, the fringe grating creates, along an axis perpendicular to the grating, a mean index which is less than the normal index of the material. This therefore naturally results in a negative uniaxial birefringent medium, the induced optical axis of which is perpendicular to the plane of the fringes (these being assumed to be plane, at least locally).

The invention can then be used to produce negative uniaxial birefringent films having an axis inclined to the plane of the film, by recording fringes in oblique planes. The invention is particularly advantageous in the latter case as it is not easy to produce materials having an inclined optical axis using purely mechanical or chemical methods. The optical method of recording inclined fringes should prove to be much more advantageous from an industrial standpoint.

Although the film created is by nature a negative uniaxial film, it is however possible, surprisingly, to produce a positive uniaxial compensation film by the same method. To do this, at least two independent fringe gratings may be recorded in the same film, these defining two different optical axes (preferably two perpendicular axes). If the index modulation is the same along these two axes, it is the normal index of the material which becomes the extraordinary index, greater than the indices induced along the two modulation axes. The material therefore becomes a positive uniaxial material, this being so in whatever direction.

In an alternative embodiment, if it is wished to compensate for the birefringence using a biaxial optical medium, it is possible to record two fringe gratings in the same film, these corresponding to two different optical axes but with different degrees of modulation. The superposition of the two crossed gratings defines the equivalent of a biaxial medium, but requires only a single film.

In a particularly simple embodiment, a compensation structure may be produced which comprises the superposition of a holographic film with negative uniaxial induced birefringence having an axis perpendicular to the plane of the film (fringes parallel to the plane of the film) and of a holographic film with negative uniaxial induced birefringence having an axis which is inclined with respect to the film and with respect to the normal to the film (fringes which are oblique with respect to the plane of the film).

BRIEF DESCRIPTION OF THE DRAWINGS

Other features and advantages of the invention will appear on reading the detailed description which follows and which is given with reference to the appended drawings in which.

DETAILED DESCRIPTION OF THE PREFERRED EMBODIMENTS

Figure 1B:
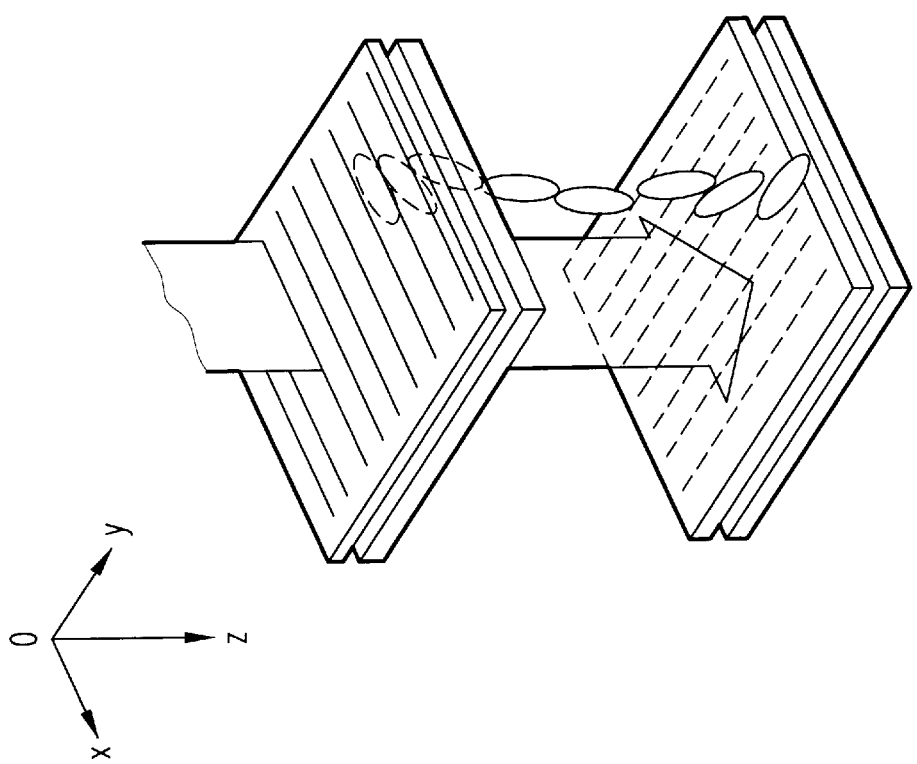
FIG. 1 shows diagrammatically a liquid-crystal cell in the off state and in the on state.

The invention will be explained with regard to a particular example, which is a twisted-nematic liquid-crystal cell.

In order to make the invention more clearly understood, a few points will be recalled below.

Twisted-nematic liquid crystals are birefringent optical media. A birefringent medium is an anisotropic optical medium in which the various polarizations of light do not propagate all at the same velocity, i.e. the optical index seen by the light is not the same for all the polarizations. This medium therefore induces a different phase difference for the various polarizations. Since the polarization of the light is defined by the phase difference between the components of the electromagnetic field along two orthogonal axes, this means that the birefringent medium modifies overall the polarization of the incident light.

However, because the birefringence is tied to the molecular structure, a birefringent medium generally possesses particular axes which do not modify the polarization of the light. If light enters polarized along one of these axis, it emerges with the same polarization. If it enters with a polarization which is not along one of the particular axes, the polarization is modified by the medium.

The optical properties of a birefringent medium may be represented symbolically by a mathematical model, which is the index ellipsoid: this is an ellipsoid in a coordinate system consisting of the three particular axes of the medium; the lengths of the axes of the ellipsoid are the propagation indices for light assumed to be polarized along each of these axes; the polarization of light polarized along one of the axes of the ellipsoid will be unchanged and the light will experience a propagation index corresponding to the length of this axis.

Birefringent media are called unaxial media if the ellipsoid is an ellipsoid of revolution, i.e. there are two orthogonal polarization axes for which light propagates with the same index no called the ordinary index, and a third axis, called the extraordinary axis or the optical axis, for which it propagates with a different index $n_e$, called the extraordinary index. The difference between the indices is very small, for example 0.1%, but this is sufficient to induce very large modifications in the polarization. Media are biaxial if the ellipsoid is not an ellipsoid of revolution, i.e. if the three particular orthogonal axes have three different indices.

When light passes through a uniaxial medium at any angle of incidence, it may be divided into two orthogonal polarization components, one of which always has an index $n_o$ and the other an index n which depends on the angle of incidence and which is between $n_o$ and $n_e$ ($n=n_e$ if incidence is perpendicular to the optical axis and $n=n_o$ if it is parallel to the optical axis).

If the extraordinary index $n_e$ is greater than the ordinary index $n_o$ the medium is called a positive uniaxial medium. The ellipsoid is elongate, with the shape of a cigar. The extraordinary axis is a slow axis.

On the other hand, if the extraordinary index $n_e$ is less than the ordinary index $n_o$ the medium is called a negative uniaxial medium. The ellipsoid is flattened, with the shape of a cushion. The extraordinary axis is a fast axis.

In order to produce the compensation structure for a liquid-crystal cell, the birefringence effects of which are very complex, it is firstly necessary to try to model the cell. Here, the cell modelled is a twisted-nematic cell.

The constitute material of the liquid-crystal cell is fundamentally a positive uniaxial birefringent medium because of the elongate structure of the molecules of which it is composed.

It will be recalled that a twisted-nematic cell comprises a thin layer of liquid crystal which possesses an off state (no electric field), in which the molecules of the crystal all remain parallel to the plane of the thin layer, and an on state in which an electric field perpendicular to the plane of the thin layer tends to orient the molecules perpendicular to the plane of the thin layer.

Figure 1A:
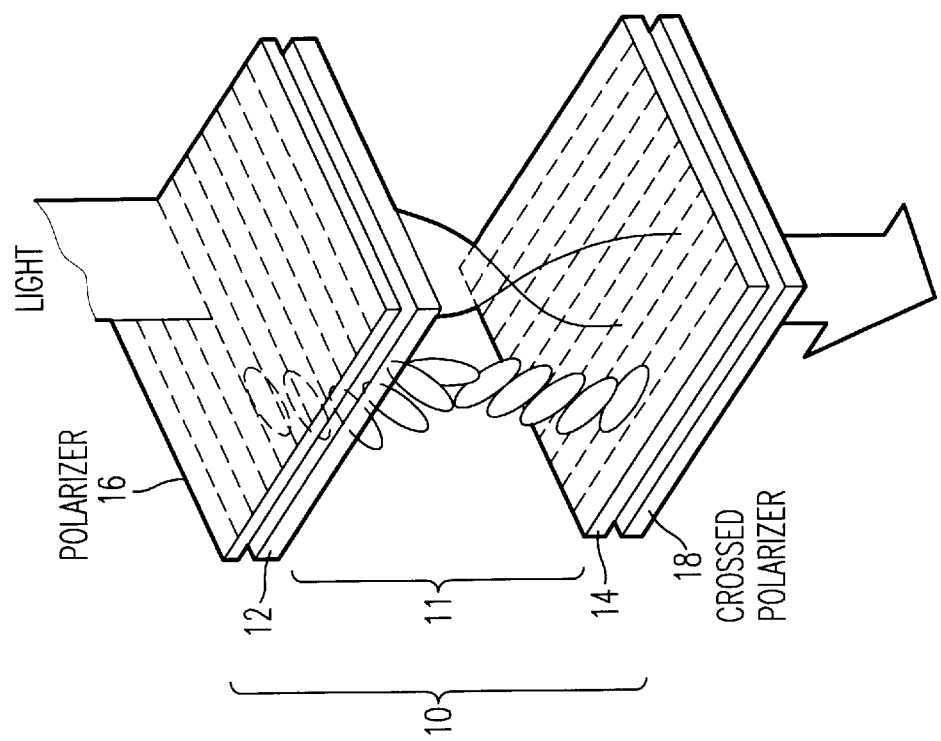

FIG. 1 shows diagrammatically this molecular structure. A thin layer of liquid crystal 10 is placed between two transparent walls 12 and 14 which have been treated, generally by rubbing, so that the molecules naturally tend to orient in a defined direction parallel to the walls. The direction for the wall 12 is perpendicular to the direction for the wall 14. Interaction between the molecules then produces, at rest, a helical layered structure in which the molecules remain parallel to the plane of the thin wall but gradually rotate through 90° between the two walls.

An entrance polarizer 16 only allows light of a single polarization direction to enter the cell. An exit polarizer 18 allows only a single polarization direction to leave the cell. The walls of the cell are coated with transparent electrodes in order to allow the cell to be turned on, i.e. to apply an electric field perpendicular to the thin layer.

In this example, the polarizers are parallel to the rubbing directions in order to let through only the light polarization parallel to the orientation of the molecules adjacent to the walls. However, it will be noted that the walls could be rubbed perpendicular to the directions of the polarizers without changing the principle. They may also be rubbed at other angles, for example at 45° to the directions of the polarizers.

When referring to the orientation of the molecules, this is the orientation in terms of optical anisotropy, i.e. the orientation of the optical axis of the molecules of a medium in question is considered as being uniaxial: hereinafter, no distinction will be made between the concept of orientation of the molecules and the concept of orientation of the optical axis.

In the off state (FIG. 1a), the cell receives light with the polarization imposed by the entrance polarizer 16; it gradually rotates this polarization through 90°, and the exiting light, with its polarization rotated through 90°, leaves unhindered through the polarizer 18 which is crossed with the polarizer 16. Structures with parallel polarizers that are uncrossed also exist, and it will be understood that they operate in the opposite manner.

In the on state (FIG. 1b), the molecules tend to orient vertically, i.e. perpendicular to the walls of the cell. They no longer rotate the polarization of the incident light through 90°. The entrance polarization, imparted by the polarizer 16, tends on the contrary to remain at the exit of the optical medium and encounters the crossed polarizer 18, which does not let it through.

The operation is most effective when the incidence of the light is normal to the plane of the thin layer of liquid crystal.

However, for oblique rays the molecules oriented vertically by the electric field exert a substantial birefringence effect, so that the polarization is however modified. A fraction of the light passes through the exit polarizer, reducing the contrast between the excited state and the unexcited state.

Moreover, in reality the helical structure does not completely disappear in favour of the vertical structure. The molecules adjacent to the walls tend to remain oriented in the preferred direction which is naturally conferred on them by the wall treatment. The resulting structure is therefore a mixture of a residue of helical structure and an ensemble of molecules oriented perpendicular to the plane of the thin layer. The molecules gradually orient away from the horizontal towards the vertical and then gradually return to the horizontal, while gradually rotating through 90° in the horizontal plane.

This structure exhibits complex birefringence properties and induces polarization variations which also depend on the angle of incidence of the light rays through the layer; one of the aims of the invention is to minimize the negative effects.

According to the invention, this is accomplished by using transparent compensation films in which volume holograms inducing a desired artificial birefringence have been recorded.

Figure 2:
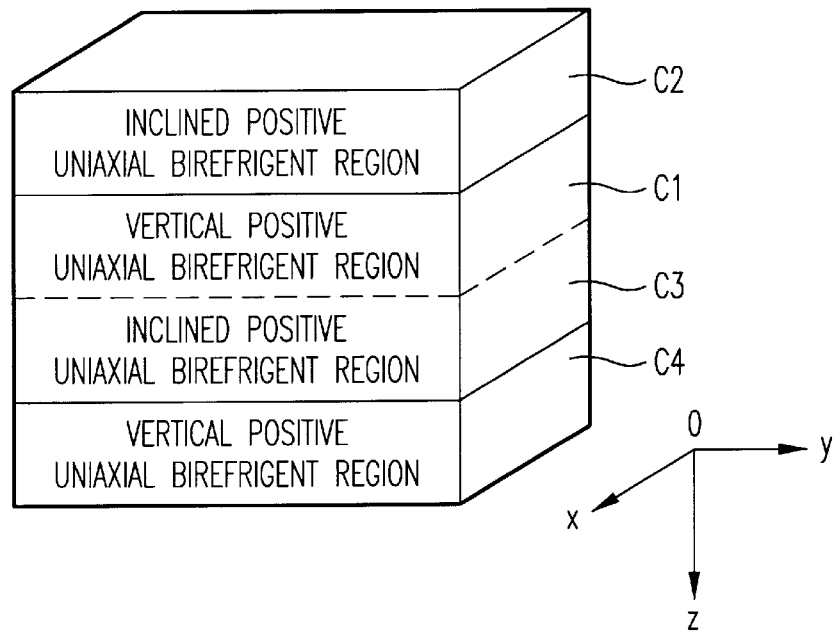
FIG. 2 shows a model of the cell.

The cell may be modelled, in its on state, by three successive regions of homogeneous birefringence, which are respectively a central region in which the birefringence ellipsoids are considered as being vertical and two lateral regions in which the ellipsoids are regarded as being all oriented, on average, obliquely with respect to the vertical and optionally with respect to the wall-rubbing directions. From symmetry, the central region may even be subdivided into two identical regions. FIG. 2 shows this schematic model with, in succession:

a region C2 of positive uniaxial medium, having an extraordinary axis inclined with respect to the vertical and with respect to the direction of orientation of the molecules on the first wall;

a region C1 of positive uniaxial medium, having a vertical extraordinary axis, a region C3, identical to the region C1, of positive unaxial medium with a vertical extraordinary axis, and a region C4 of positive uniaxial medium having an extraordinary axis inclined with respect to the vertical and with respect to the direction of orientation of the molecules on the second wall.

Figure 3:
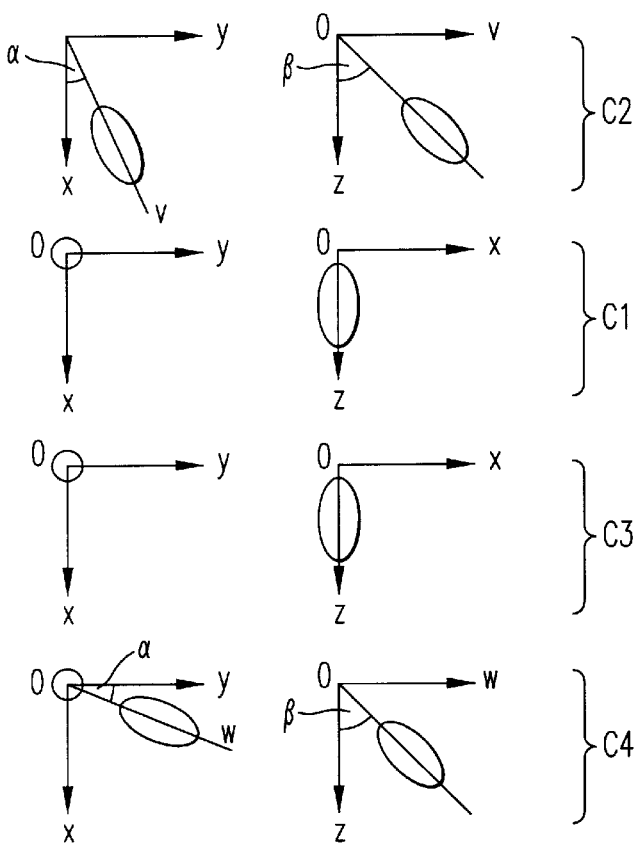
FIG. 3 shows the orientations of the index ellipsoids of the model chosen.

FIG. 3 shows the angles of inclination of the index ellipsoids in a coordinate system Oxyz in which Oz is the vertical (perpendicular to the plane of the thin layer of liquid crystal), Ox is the direction of orientation of the molecules on the first wall and Oy is the direction of orientation of the molecules on the second wall.

The extraordinary axes of the regions C1 and C3 are vertical (orientation along Oz).

The projection of the extraordinary axis of the region C2 in the xOy plane is inclined at an angle $\alpha$ with respect to Ox; this projection defines a direction Ov in the xOy plane; moreover, the extraordinary axis is inclined at an angle $\beta$ with respect to the Oz axis, that is to say it makes an angle $\beta$ with respect to Oz in the Ovz plane.

Likewise, the extraordinary axis of the region C4 is inclined at an angle $\beta$ with respect to the vertical Oz and at an angle $\alpha$ with respect to the horizontal direction Oy, that is to say the horizontal projection Ow of this extraordinary axis on the xOy plane makes an angle $\alpha$ with respect to Oy.

The liquid-crystal cell may therefore be represented by a model comprising four homogeneous birefringent regions, the important parameters of which are the thicknesses of the regions along Oz and the angles $\alpha$ and $\beta$.

The undesirable variations in birefringence may then be compensated for in a symmetrical manner, i.e. by compensating for the two first regions C1, C2 by using a first compensation half-structure formed on one side of the cell and the two last regions C3, C4 by using a second half-structure, symmetrical with the first, formed on the other side of the cell. The symmetry involved is a symmetry with respect to a horizontal plane with regard to the angle of inclinations $\beta$ with respect to the vertical, but a symmetry with respect to the bisector of the 90° angle separating the wall-rubbing directions of the cell, with regard to the angles of inclination α of the horizontal projections.

In general, the usual compensation principle is that the birefringence of a positive uniaxial medium may be compensated for by a negative uniaxial medium having the same axis and introducing the same phase difference between crossed polarizations.

The central regions C1 and C3 will therefore be each compensated for by a film containing a volume hologram consisting of horizontal fringes which induce a negative uniaxial birefringence having a vertical optical axis. This is because the overall birefringence induced by a grating of parallel fringes is characterized by an index ellipsoid having an extraordinary axis perpendicular to the plane of the fringes and a mean extraordinary index which is less than the ordinary index. The regions C2 and C4 will therefore be each compensated for by a film containing a volume hologram consisting of inclined fringes lying in planes perpendicular to the axis of the ellipsoid of the regions C2 or C4, respectively.

It may be assumed that the holographic film exhibits a sinusoidal electrical permittivity modulation of the form:

$$\epsilon = \epsilon_0 + \epsilon_1 \cos[(2\pi/\lambda)x],$$

where $\epsilon_0$ represents the normal permittivity and $\epsilon_1$ represents the degree of modulation of the holographic recording, $\lambda$ represents the wavelength of the modulation and x the distance along the direction of modulation.

In this case, it may be shown that the mean index $n_e$ for a polarization in the direction of modulation is less than the normal index $n_o$ (the index of the unmodulated transparent material) in polarization directions normal to this direction of modulation; and the extraordinary index $n_e$ is equal to the fourth root of $(\epsilon_0^2 - \epsilon_1^2)$, hence the negative uniaxial birefringence induced by such a recording. This birefringence may be represented by an ellipsoid of revolution, the minor axis of which, perpendicular to the fringes, has a length $n_e$ and the ordinary axes of which have a length $n_o$.

Figure 4:
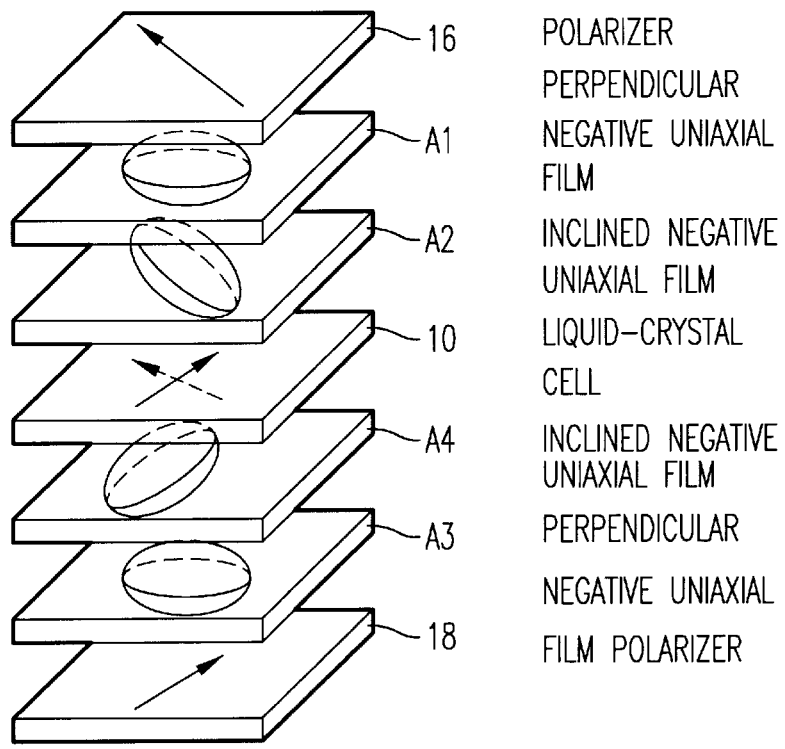
FIG. 4 shows a panel with a compensation structure according to the invention.

FIG. 4 shows the overall structure of the compensated panel, with a film consisting of horizontal fringes, A1 or A3, and a film consisting of inclined fringes (A2 or A4) on each side of the liquid-crystal cell. The polarizers are placed on either side of the assembly thus formed. The inclined fringes are preferably at 45° to the plane of the film. The directions of modulation may moreover be oblique with respect to the rubbing direction of the walls of the cell (at the angle α, as explained with regard to the modelling of the cell).

The choice of thicknesses of the compensation films results from retardation calculations in the chosen liquid-crystal model. The phase retardation introduced between two orthogonal polarizations in the case of a positive uniaxial film of defined inclination is equal to the film thickness through which the light passes multiplied by the difference in indices seen along the two orthogonal polarizations. It will be recalled that these indices may be calculated by making the index ellipsoid, having axes $n_o$ and $n_e$, be intersected by a plane wave at a given angle of incidence. The phase-difference calculation may be made in the case of normal incidence and in the case of a preferred angle of incidence for which it is desired to have maximum contrast. The thickness of the films is then calculated in order to achieve the best possible compensation for this phase difference using a reverse phase difference.

It will be understood that the liquid-crystal cell may be modelled in other ways and that, depending on the model chosen, the compensation films may be different. The invention is particularly useful because it is not limited with regard to the angles of inclination that the fringes may be given, and therefore it is not limited with regard to the choice of a defined extraordinary axis (whereas it is difficult to obtain inclined extraordinary axes using other methods).

In the particular case in which in which it is desired to produce a positive uniaxial birefringent compensation film, two orthogonal crossed gratings will be recorded in the holographic film, producing two identical mean indices $n_e$ in two orthogonal directions. The index in the perpendicular direction will remain the normal index $n_o$ of the unmodulated material. The index ellipsoid becomes an elongate ellipsoid of revolution, the index $n_o$ of which in fact becomes the extraordinary index, greater than the mean index $n_e$ in the two directions of modulation, the extraordinary index being greater than the ordinary indices, this being characteristic of a positive uniaxial medium.

This same result could be obtained by recording more than two gratings, in several directions of modulation that are distributed in the same plane, these directions all being orthogonal to the same axis, which becomes the extraordinary axis of the positive uniaxial medium.

In addition, certain electrooptic cell birefringence models may require compensation using a biaxial film. In this case, the most advantageous solution is to provide a double holographic modulation: two independent fringe gratings, parallel to two desired planes, therefore inducing two axes along which the index is smaller than the normal index of the material, are created. The planes may be chosen in any manner (depending on the compensation requirements) and the indices along these two axis may be different since they depend on the amplitude of the modulation in permittivity conferred on the material. This amplitude depends on the energy applied to the material in order to modulate it.

The typical phase differences which it is desired to compensate for in liquid-crystal cells are about 450 nanometers for the overall cell, including part (for example half) in the case of that part of the cell which is modelled by a vertical optical axis and the other part in the case of that part of the cell which is modelled by an inclined optical axis.

Using a material such as dichromated gelatine, having an index of approximately 1.52 and undergoing a sinusoidal modulation having an amplitude of approximately 0.09, it is possible to calculate the index in the axis perpendicular to the plane of the holographic fringes. In fact, it may be calculated that the index undergoes a modulation $n = n_o + n_1 \cos(2\pi x/\lambda)$ where $n_o = (\epsilon_o)^{1/2}$ and $n_1 = [\epsilon_1/2\epsilon_o]^{1/2}$ in the direction perpendicular to the fringes and the mean index in this direction is then the fourth root of $(n_o^4 - 4n_o^2 n_1^2)$.

In the case of dichromated gelatine, the typical values are $n_o = 1.520$ and $n_1 = 0.09$, which gives a mean extraordinary index of 1.514. In order to obtain a phase difference of 100 nanometers, the thicknesses have to be approximately 15 micrometers, and for 200 nanometers, they must be 30 micrometers. These thicknesses may easily be obtained by depositing photosensitive gelatine.

In order to record the volume hologram consisting of parallel plane fringes, two beams of coherent monochromatic light must be made to interfere. The fringes are created in planes perpendicular to the bisector of the angle formed by the two beams.

For example, by sending a laser beam perpendicular to a mirror, the reflected beam returns parallel to the incident beam and the fringes are created parallel to the mirror. If it is desired for the fringes to be oblique with respect to the plane of the film, all that is required is then to place the film obliquely with respect to the mirror.

Figure 5:
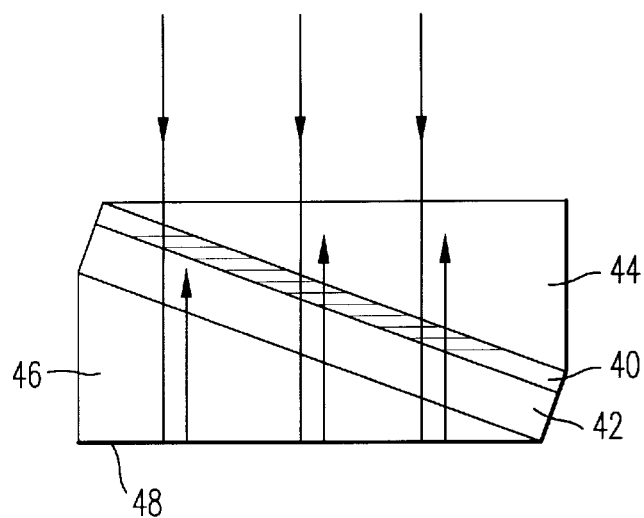
FIG. 5 shows an example of a process for producing a holographic film with inclined fringes.

FIG. 5 shows an arrangement for forming inclined fringes in a film 40 of a material having a photoinduced index variation (dichromated gelatine or another photorefractive polymer). The film is supported by a glass plate 42 which is placed between two prisms 44 and 46 with oblique faces. The incident wave is perpendicular to one face of the first prism 44; it passes through the oblique second face of this prism and then passes through the film 40, the plate 42 and the first oblique face of the second prism 46. The second face of the second prism is perpendicular to the incident beam and is coated with a reflective layer 48. The incident beam interferes with the oblique beam. The fringes created in this configuration are parallel to the mirror and oblique with respect to the faces of the film. Other configurations are possible.

The fringes are created in the film with a spacing which is $\Lambda/(2n)$ where $\Lambda$ is the wavelength of the laser for recording the hologram and n is the index of the film for the recording light. When the fringes are illuminated, in use, perpendicular to the film, the spacing seen by the light becomes $\lambda/2n\cos\alpha$, $\alpha$ being the obliquity of the fringes.

In order for the fringe spacing to be in all cases less than the illumination wavelength during use, the recording wavelength must be much shorter than the use wavelength. The fringes will therefore be recorded in ultraviolet light (argon laser, or an Nd:YAG laser followed by a frequency tripler). If the use involves a relatively wide range of visible wavelengths, this condition must of course be satisfied in the case of the shortest wavelengths in the range.

The fringe recording wavelength is preferably half the use wavelength. This is because, in this case, the induced birefringence is a maximum.

In order to record two gratings in the same film, the operation is repeated by choosing another prism angle, optionally rotating the film about itself, and, in order to achieve biaxial compensation, by modifying the degree of modulation (and therefore the energy of the laser used for the recording).

What is claimed is:

1. An electrooptic display device, comprising:
   an electrooptic element having a birefringence; and
   a compensating structure configured to compensate for said birefringence,
   wherein said compensating structure comprises a film having a volume hologram with a pattern of interference fringes oriented at a non-zero angle with respect to a plane defined by said film and having birefringent properties induced by said interference fringes.

2. The device according to claim 1, wherein:
   the device is designed to operate with compensation for a defined range of wavelengths, and
   the interference fringes are separated by a spacing of less than the wavelengths of said range.

3. The device according to claim 2, wherein the interference fringes are oblique with respect to the plane of the film.

4. The device according to claim 2, wherein the volume hologram has a first pattern of interference fringes oriented at a first non-zero angle with respect to the plane defined by said film, and a second pattern of interference fringes oriented at a second angle with respect to said plane.

5. The device according to claim 2, wherein the volume hologram is configured to induce a negative uniaxial birefringence.

6. The device according to claim 2, wherein the volume hologram is configured to induce a biaxial birefringence.

7. The device according to claim 2, wherein the volume hologram is configured to induce a positive uniaxial birefringence.

8. The device according to claim 2, comprising:
   at least one film with holographic recording which induces a negative birefringence along an axis perpendicular to the plane of the film, and
   another film with holographic recording which induces a negative birefringence along an axis which is inclined with respect to the plane of the film and with respect to the normal to the film.

9. The device according to claim 1, wherein the interference fringes are oblique with respect to the plane of the film.

10. The device according to claim 9, wherein the volume hologram has a first pattern of interference fringes oriented at a first non-zero angle with respect to the plane defined by said film, and a second pattern of interference fringes oriented at a second angle with respect to said plane.

11. The device according to claim 1, wherein the volume hologram has a first pattern of interference fringes oriented at a first non-zero angle with respect to the plane defined by said film, and a second pattern of interference fringes oriented at a second angle with respect to said plane.

12. The device according to claim 1, wherein the interference fringes of said first and second patterns are mutually perpendicular.

13. The device according to claim 1, wherein the volume hologram is configured to induce a negative uniaxial birefringence.

14. The device according to claim 1, wherein the volume hologram is configured to induce a biaxial birefringence.

15. The device according to claim 1, wherein the volume hologram is configured to induce a positive uniaxial birefringence.

16. The device according to claim 1, comprising:
   at least one film with holographic recording which induces a negative birefringence along an axis perpendicular to the plane of the film, and
   another film with holographic recording which induces a negative birefringence along an axis which is inclined with respect to the plane of the film and with respect to the normal to the film.

17. The device according to claim 16, wherein the angle of inclination of the inclined axis is approximately 45°.

* * * * *